United States Patent Office 3,441,469
Patented Apr. 29, 1969

3,441,469
PROCESS FOR PREPARING POLYAMIDE/OLEFIN POLYMER GRAFT COPOLYMER ADHESIVE
Chester W. Fitko and Abraham Ravve, Chicago, Ill., assignors to Continental Can Company, New York, N.Y., a corporation of New York
No Drawing. Filed June 7, 1967, Ser. No. 644,046
Int. Cl. B32b 27/34, 27/04
U.S. Cl. 161—186    11 Claims

ABSTRACT OF THE DISCLOSURE

An adhesive is prepared by admixing a graft copolymer of an olefin polymer and a synthetic linear polyamide of the nylon type with a small amount of the reaction product of an aromatic polyhydroxy carboxylic acid and an aliphatic diamine and heating the admixture to an elevated temperature for a time sufficient to permit reaction between the graft copolymer and the aromatic polyhydroxy carboxylic acid-aliphatic diamine reaction product.

BACKGROUND OF INVENTION

Field of invention

The present invention relates to a process for preparing an adhesive composition for bonding adjacent surfaces to one another and more particularly relates to a process preparing an adhesive composition for forming high-strength bonds comprised of a graft copolymer of a synthetic linear polyamide and an olefin polymer which forms an adhesive joint of greatly increased peel strength.

The prior art

Because of their high chemical inertness and high tensile strength, synthetic linear polyamides of the nylon type are very desirable as organic adhesives for the cementing of various surfaces, principally, metals. However, a deficiency common to all of the these polyamides is their poor adhesion to most, if not all, metal surfaces.

SUMMARY OF THE INVENTION

The deficiencies of the prior art have been overcome in accordance with the present invention wherein a graft copolymer of a synthetic liner polyamide and an olefin polymer having excellent adhesion properties is prepared by admixing a graft copolymer containing about 85 to about 97 percent by weight of a polyamide and about 3 to about 15 percent by weight of an olefin polymer with the reaction product of an aromatic polyhydroxy carboxylic acid and an aliphatic diamine, and heating the admixture to an elevated temperature for a time sufficient to allow the aromatic polyhydroxy carboxylic acid and aliphatic diamine reaction product to interact with the graft copolymer.

The graft copolymer compositions prepared in accordance with the present invention are well-suited as bonding materials for interfolded side seams of sheet metal containers, including uncoated steel, that is, black iron plate, and steel having an organic or metal, e.g., enamel or tin, coating thereover. Excellent bonds are also produced between other metal surfaces, such as copper, bronze, and aluminum surfaces. The adhesive strength of the graft copolymer compositions to metals are sufficiently great to enable these compositions to be a satisfactory substitute for metallic solder as the bonding agent in the side seam of the metal can.

PREFERRED EMBODIMENTS

Aromatic polyhydroxy carboxylic acids which may be employed in the process of the present invention are carboxylic acids having the general structural formula:

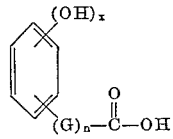

wherein G is a divalent aliphatic group containing 1 to 4 carbon atoms, $n$ is an integer from 0 to 1 and $x$ is an integer from 2 to 4.

Typical examples of aromatic polyhydroxy carboxylic acids which may be employed in preparing the polyamide adhesives of the present invention include 2,3-dihydroxybenzoic acid (pyrocatechuic acid), 2,4-dihydroxybenzoic acid ($\beta$-resorcyclic acid), 2,5-dihydroxybenzoic acid (gentisic acid), 2,6-dihydroxybenzoic acid ($\gamma$-resorcyclic acid), 3,4-dihydroxybenzoic acid (protocatechuic acid), 2,3,4-trihydroxybenzoic acid (4-pyrogallol carboxylic acid), 2,4,5-trihydroxybenzoic acid (4-hydroxy gentisic acid), 2,4,6-trihydroxybenzoic acid (phloroglucinol carboxylic acid), 3,4,5-trihydroxybenzoic acid (gallic acid), and 2,3,4,5-tetrahydroxybenzoic acid, 3,4-dihydroxyphenyl acetic acid, 3,4-dihydroxyphenyl propionic acid, 3,4-dihydroxyphenyl butyric acid, and 3,4-dihydroxyphenyl pentanoic acid.

The aliphatic diamines which may be used to prepare the adhesive composition of the present invention have the general formula:

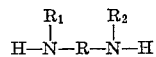

wherein R is an alkylene group containing at least 2 and preferably from 2 to 12 carbon atoms, and $R_1$ and $R_2$ are hydrogen atoms or monovalent aliphatic radicals. Examples of suitable diamines within the scope of the present invention include ethylene diamine, trimethylene diamine, tetramethylene diamine, pentamethylene diamine, hexamethylene diamine, heptamethylene diamine, octamethylene diamine, decamethylene diamine, dodecamethylene diamine. Other diamines include 1,2-diaminopropane, 1,2-diaminobutane, 1,3-diaminobutane, the cyclohexane diamines, piperazine, 3-methyl-hexamethylene diamine, N,N' dimethyl-hexamethylene diamine, N,N' diethyl-hexamethylene diamine, N,N' diethyl-ethylene diamine, N,N' dimethyl-trimethylene diamine, N,N' diethyl-pentamethylene diamine, N,N' dimethyl-octamethylene diamine, N,N' diethyl-decamethylene diamine, 1,12 diamine-octadecane, N,N' dimethyl-dodecamethylene diamine, N,N' dipropyl-1,3 diaminobutane, N,N' dimethyl-cyclohexane diamine, N,N' dibutyl-3-methylhexamethylene diamine, N,N' diamyl-pentamethylene diamine, N,N' dibutyl-tetramethylene diamine, N-butyl-hexamethylene diamine, N-propyl-trimethylene diamine, and N-amyl-tetramethylene diamine.

By the expression "synthetic linear polyamide of the nylon type" is meant a long-chain synthetic polymeric amide which has recurring amide groups as an integral part of the main polymer chain having the structure:

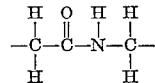

separated by alkylene groups containing at least 2 carbon atoms and having an intrinsic viscosity of 0.1 or more. Intrinsic viscosity is defined in U.S. Patent 2,130,948.

Among the polyamides which are useful in the present invention are polypentamethylene sebacamide, polyhexamethylene adipamide (Nylon 66), polyhexamethylene nonanamide (Nylon 69), polyhexamethylene sebacamide (Nylon 610), polydecamethylene adipamide, polydecamethylene sebacamide, poly-m-phenylene sebacamide, polycapro amide (Nylon 6), poly-7-heptanoamide (Nylon 7), poly-11-undecanoamide (Nylon 11), polylauryl lactam (Nylon 12), as well as other polyamides and interpolyamides of the types mentioned in U.S. Patent 2,071,253, U.S. 2,130,523 and U.S. 2,130,948 issued to W. H. Carothers, and U.S. 2,285,009 issued to M. M. Braubaker et al.

The commerically available polyamides of the nylon type melt at temperatures of the order of about 180° to about 260° C.

The term "olefin polymer" as used in this specification refers to homopolymers of monoolefines containing from 2 to 4 carbon atoms, such as ethylene, propylene, and butylenes, such as isobutylene, butene-1 and butene-2, and styrene, as well as copolymers of said monoolefines and styrene with up to 50 percent by weight based on the weight of the copolymer of other ethylenically unsaturated monomers, for example, dienes, such as butadiene and isoprene, acrylic or methacrylic acid and/or their derivatives, such as acrylonitrile, acrylamide, methacrylamide, methyl, ethyl, propyl, butyl, 2-ethylhexyl, decyl and tridecyl esters of acrylic or methacrylic acid, vinyl halides, such as vinyl chloride and vinylidiene chloride, vinyl esters, such as vinyl acetate and vinyl propionate, and vinyl ethers, such as vinyl isobutyl ether.

The graft copolymers of the present invention are graft copolymers containing about 85 to about 97 percent by weight of the polyamide and about 3 to about 15 percent by weight of the olefin polymer.

The term "graft copolymer" is intended to include block copolymers as well as graft copolymers.

The graft copolymers used to prepare the adhesive compositions of the present invention are obtainable by the conventional and well-known process of the prior art, as illustrated in U.S. Patents 3,261,885 and 2,907,675, and "Khim. Volohna," 1963, (vol. 6), pp. 24–28.

The aromatic polyhydroxy carboxylic acid-aliphatic diamine reaction product may conveniently be formed by adding the carboxylic acid and diamine in separate amounts to the graft copolymer. At the elevated temperatures employed for admixing these materials in the graft copolymer, the aromatic polyhydroxy carboxylic acid and the aliphatic diamine react to form the respective polyhydroxy phenyl diamine with the liberation of water.

While it is not intended to have the present invention limited to any theory regarding the cause or results obtained by the present invention, it is believed that the improvement in adhesive properties of the graft copolymer is caused by a chemical modification in the graft copolymer chain as a result of an interaction between the aromatic polyhydroxy carboxylic acid-aliphatic diamine reaction product and the polyamide portion of the graft copolymer at the elevated temperatures to which the admixture of these materials is subjected.

The presence of the liberated water formed during the formation of the aromatic polyhydroxy carboxylic acid-aliphatic diamine reaction product permits an exchange or transamidation reaction to occur between the diamide reaction product and the polyamide portion of the graft copolymer wherein the resultant polymer product will contain the polyhydroxy phenyl diamide in the backbone chain.

As would be obvious to one skilled in the art, instead of adding the aromatic polyhydroxy carboxylic acid and aliphatic diamine in separate amounts to form the diamide reaction product, equivalent results may be obtained by adding the salt formed by the reaction of an aromatic polyhydroxy carboxylic acid and the aliphatic diamine to the polyamide/olefin polymer graft copolymer and heating the mixture to a temperature at which transamidation occurs.

The amount of aromatic polyhydroxy carboxylic acid and aliphatic diamine reaction product added to the polyamide/olefin polymer graft copolymer may be varied over a fairly wide range without departing from the spirit of the invention. Thus, the combined total amount of the carboxylic acid and aliphatic diamine incorporated in the graft copolymer may range from about 0.5% to about 5% based on the weight of the graft copolymer, and especially desirable results are obtained when the percent total of both components varies from about 1 to about 3 weight percent.

The aromatic polyhydroxy carboxylic acid-aliphatic diamine reaction product is incorporated in the polyamide/olefin polymer graft copolymer by first homogenously admixing, by any means known to the art, the separate reaction product components, the salt thereof, or the diamide, and the graft copolymer. The physical admixture is then heated to a temperature of about 195° to about 270° C. and most preferably to a temperature within that range about the melting point of the particular graft copolymer composition used.

The heated mixture is subjected to agitation to insure a homogenous blend and the surface of the mixture is preferably maintained under an inert atmosphere to prevent oxidative deterioration. Satisfactory blending can be accomplished at temperatures in the approximate range of 200° to 300° C. If blending is done below 190° C., the components lack sufficient fluidity for intimate mixing. During the mixing operation, it is necessary only to allow sufficient time to insure a homogenous blend which in turn will insure complete reaction of the components. The time required for the reaction is dependent upon the temperature of blending and the efficiency of the agitation, and generally ranges from about 3 to about 60 minutes.

After the components are admixed for a time sufficient to insure complete reaction, the reaction mass is allowed to cool, and in this form is suitable for use as an adhesive.

One method of affecting adhesion using the polyamide/olefin polymer graft copolymer adhesive of the present invention consists in applying a thin film of the graft copolymer particles to the surface of one of the metal elements to be joined, the metal element having been heated to a temperature above the melting point of the graft copolymer to tackify the copolymer.

The second metal element is then applied to the tackified first metal surface and the assembly thus formed is subjected to a temperature at least sufficient to melt the graft copolymer and a pressure at least sufficient to hold the assembly together for a time sufficient to allow the graft copolymer to wet both opposing metallic surfaces, after which the assembly is allowed to cool and the pressure is released. It is found that by this method, a reasonably strong joint of greatly increased strength is obtained.

To illustrate the manner in which the invention may be carried out, the following example is given. It is to be understood, however, that the example is for the purpose of illustration, and the invention is not to be regarded as limited to any of the specific materials or conditions recited therein. Unless otherwise stated, all percentages cited in the example below are based on weight.

EXAMPLE

To a polycaproamide/polyethylene graft copolymer was added a salt prepared by reacting a 3,4,5-trihydroxybenzoic acid and hexamethylene diamine at a molar ratio of the acid-to-amine of 2:1. The amount of salt added to the graft copolymer was 1% based on the weight of the graft copolymer.

The polycaproamide/polyethylene graft copolymer was a graft copolymer containing 90 percent by weight of the polycaproamide and 10 percent by weight polyethylene based on the copolymer. The graft copolymer had a melt viscosity at 230° C. of $0.53 \times 10^4$ poises at 100 reciprocal seconds and 0.23×10⁴ poises at 1000 reciprocal seconds, a melting point (obtained by differential thermal analysis) of 216° C. and a recrystallization temperature of 180.5° C.

The mixture of ingredients was heated in a nitrogen atmosphere to 270° C. at which temperature the mixture became molten. The admixture was maintained at this temperature for 1 hour, after which time the admixture was allowed to cool to room temperature.

The product prepared above was spread into a thin film over a one-inch square area at one end of a 1" x 6" x 5 mil strip of an epoxyphenol-enamel coated black iron strip which had been previously heated to 288° C. After cooling, another 1" x 6" x 5 mil strip was positioned over the adhesive film surface of the first strip and the strip assembly was reheated to 288° C. under light pressure (30 p.s.i.) to insure intimate contact of the adhesive resin with the metal strips. The heating at 288° C. was continued for a period of approximately 5 seconds, during which time the adhesive product between the strips became molten. The strip assembly was then cooled, and the peel strength of the assembly was determined.

The peel strength of the assembly, i.e., a measure of the load required to peel apart the adhered joint, was determined by pulling the bonded strips apart at an angle of 180° to the bond in an Instron machine at a rate of 0.5 inch per minute.

The above procedure was repeated with the exception that in separate runs, the salt of 3,4-dihydroxybenzoic acid and ethylene diamine was substituted for the 3,4,5-trihydroxybenzoic acid-hexamethylene diamine salt and was incorporated in the graft copolymer at varying concentrations.

For purposes of comparison, the peel strength of a strip assembly bonded with the same graft copolymer in which no salt was added was also determined.

The peel strength of the strip assemblies prepared above are summarized in the table below.

TABLE

| Test No. | Salt added to graft copolymer | Percent salt additive in graft copolymer | Peel strength (lbs./linear in. avg. 3 runs) |
|---|---|---|---|
| 1 | 3,4,5-trihydroxy-benzoic acid/ hexamethylene diamine. | 1 | 21.0 |
| 2 | 3,4-dihydroxy-benzoic acid/ ethylene diamine. | 1 | 35.0 |
| 3 | do | 3 | 31.0 |
| C₁ | None | None | 1.0 |

By referring to the table, it is at once apparent that the strip assemblies bonded with graft copolymer compositions of the present invention (Test Nos. 1–3) have substantially greater peel strengths when compared to the peel strengths of a steel assembly bonded by the same method using an unmodified graft copolymer composition (Test No. C₁).

Results similar to the foregoing examples may also be obtained when any of the other mentioned aromatic polyhydroxy carboxylic acids and aliphatic diamines are incorporated in a polyamide/olefin polymer graft copolymer in a similar manner in place of those set forth in the above example.

What is claimed is:
1. A process for preparing an adhesive composition which comprises admixing a graft copolymer containing about 85 to about 97 percent by weight based on the copolymer of a synthetic linear polyamide which has recurring amide groups as an integral part of the main polymer chain having the structure

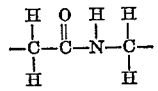

separated by alkylene groups containing at least 2 carbon atoms and having an intrinsic viscosity greater than 0.1 and about 3 to about 15 percent by weight based on the copolymer of an olefin polymer selected from the group consisting of homopolymers of monoolefins containing from 2 to 4 carbon atoms and styrene, and olefinic copolymers wherein a major proportion of the copolymer is olefinic, with about 0.5 to about 5.0 percent by weight based on the copolymer of the reaction product of an aromatic polyhydroxy carboxylic acid having the formula:

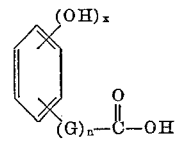

wherein G is a divalent aliphaic group containing 1 to 4 carbon atoms, $n$ is an integer from 0 to 1 and $x$ is an integer from 2 to 4 and an aliphatic diamine having the formula:

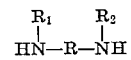

wherein R is an alkylene group containing at least 2 carbon atoms, $R_1$ and $R_2$ are selected from the group consisting of hydrogen and monovalent aliphatic radicals and heating the admixture to an elevated temperature for a time sufficient for the carboxylic acid and diamine to interact with the polyamide portion of the graft copolymer.

2. The process of claim 1 wherein the aromatic polyhydroxy carboxylic acid is 3,4-dihydroxybenzoic acid.

3. The process of claim 1 wherein the aromatic polyhydroxy carboxylic acid is 3,4,5-trihydroxybenzoic acid.

4. The process of claim 1 wherein the diamine is hexamethylene diamine.

5. The process of claim 1 wherein the diamine is ethylene diamine.

6. The process of claim 1 wherein the olefin polymer is polyethylene.

7. The process of claim 1 wherein the polyamide of the nylon type is polycaproamide.

8. The product prepared by the process of claim 1.

9. An article of manufacture comprising a plurality of metallic layers having the composition of claim 1 between adjacent surfaces thereof as a bonding material therefor.

10. The article of claim 9 wherein the metallic layers are coated with an enamel coating.

11. The article of claim 9 wherein the metallic layers are comprised of iron.

References Cited

UNITED STATES PATENTS

| | | | |
|---|---|---|---|
| 3,136,738 | 6/1964 | Hedrick | 260—857 |
| 3,243,476 | 3/1966 | Black | 260—857 |
| 3,243,477 | 3/1966 | Black | 260—857 |
| 3,261,885 | 7/1966 | Craubner | 260—857 |
| 3,325,561 | 6/1967 | Grille | 260—857 |
| 3,388,186 | 6/1968 | Kray | 260—857 |

MURRAY TILLMAN, *Primary Examiner.*

PAUL LIEBERMAN, *Assistant Examiner.*

U.S. Cl. X.R.

260—78, 857; 161—227, 214